United States Patent

[11] 3,596,948

| [72] | Inventor | Thomas F. Spoehr<br>Pacific Palisades, Calif. |
|---|---|---|
| [21] | Appl. No. | 869,958 |
| [22] | Filed | Oct. 27, 1969 |
| [45] | Patented | Aug. 3, 1971 |
| [73] | Assignee | VSI Corporation<br>Pasadena, Calif.<br>Continuation of application Ser. No.<br>810,922, Mar. 24, 1969, now abandoned,<br>Continuation of application Ser. No.<br>685,386, Nov. 24, 1967, now abandoned. |

[54] BLIND FASTENER AND BLIND FASTENER SYSTEM
3 Claims, 3 Drawing Figs.

[52] U.S. Cl. ..................................................287/189.36, 85/74
[51] Int. Cl. ............................................F16b 13/06, F16b 33/04
[50] Field of Search............................................ 85/72, 73, 74, 75, 76, 77, 78; 287/189.36

[56] References Cited
UNITED STATES PATENTS

| 2,765,699 | 10/1956 | La Torre | 85/73 |
|---|---|---|---|
| 2,971,425 | 2/1961 | Blakely | 85/73 |
| 3,034,611 | 5/1962 | Zenzic | 287/189.36 F |
| 3,307,444 | 3/1967 | Money | 85/74 |
| 3,461,771 | 8/1969 | Briles | 287/189.36 F |

FOREIGN PATENTS

| 145,722 | 3/1952 | Australia | 85/74 |

Primary Examiner—Marion Parsons, Jr.
Attorney—Christie, Parker and Hale

ABSTRACT: A three-piece blind fastener, having a nut with a longitudinally tapered intermediate portion, a core bolt and an expansible sleeve, is set in two or more sheets of material having a tapered hole by drawing the core bolt's head toward the blind side of the sheets, engaging the sleeve with the head and expanding it over a nose on the nut until the sleeve engages the blind side. When set, the longitudinally tapered intermediate portion of the nut is in interference engagement with the tapered hole in the sheets.

PATENTED AUG 3 1971
3,596,948
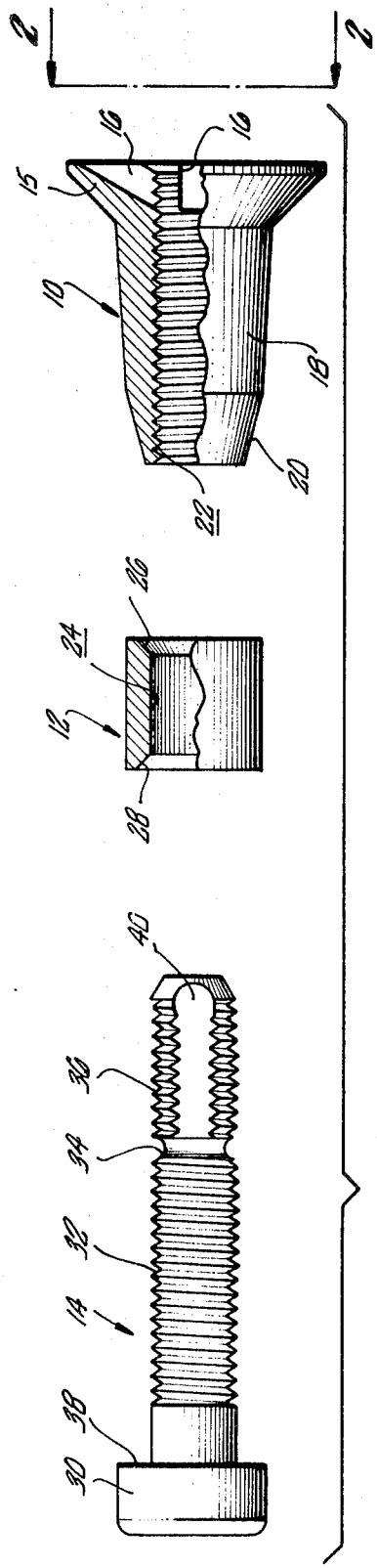
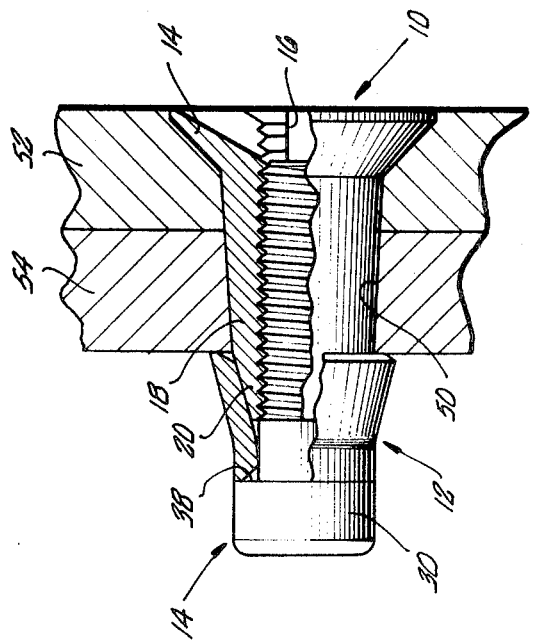
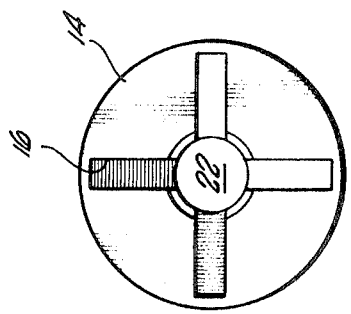
INVENTOR.
THOMAS F. SPOEHR
BY
Christie, Parker & Hale
ATTORNEYS.

3,596,948

BLIND FASTENER AND BLIND FASTENER SYSTEM

RELATED APPLICATIONS

This application is a Continuation of Application Ser. No. 810,922, filed Mar. 24, 1969, now abandoned, which was a Continuation of Ser. No. 685,386, filed Nov. 24, 1967, now abandoned.

BACKGROUND OF THE INVENTION

This invention relates to fasteners in general and, more in particular, to an improvement in three-piece blind fasteners.

The present invention relates to the type of three-piece blind fastener having a nut, a headed core bolt and an expansible sleeve. The core bolt has a threaded shank with a breakneck portion separating the shank from a breakoff portion. The nut has a head at one end to provide axial restraint on the driving side of two or more sheets and a tapered nose at its other end which extends beyond the blind side of the sheets. The sleeve is interposed between the nut's nose and the core bolt head. The fastener is set by rotating the core bolt with a driving tool engaged with the breakoff portion while holding the nut in the sheets. The core bolt head is drawn inwardly towards the blind side of the sheets to expand the sleeve over the conical nose of the nut to force the sleeve into compressive contact with the sheets. Upon reaching a predetermined torsional stress, the breakoff or driving portion of the core bolt severs from the shank at the breakneck groove. Axial restraint is provided in the set fastener by the expanded sleeve and the head of the nut. This type of fastener is described in U.S. Pat. No. 2,765,699 to J. La Torre.

The type of fastener just described is extensively used as a substitute for standard nuts and bolts in aerospace and aircraft applications where high speed and ease in installation are required. The nut employed has a cylindrical intermediate section which is received in the hole in the sheets secured by the fastener. A small clearance is usually provided between the intermediate portion and the hole. The clearance results from the practical inability to provide an interference fit between the cylindrical intermediate portion and its mating hole. Without an interference fit, stress conditions often arise which lead to either fatigue or bearing failure.

The small but discernible clearance between the body of the nut and its hole creates a fastener system which has a weakness in resistance to bearing stresses acting on the sheets. When bearing forces are experienced, the body of the cylindrical fastener will contact its mating hole in a relatively small area. With a sufficiently high bearing stress, the resulting small amount of bearing area produces permanent, plastic deformation of sheet material and, in some cases, in the body of the fastener. At a minimum, the deformation enlarges the hole thereby allowing movement between the sheets with continued bearing forces. When the sheets are relatively thin, the permanent deformation creates axial misalignment between the fastener and its hole because of the action of displaced sheet material on the fastener. Axial misalignment causes loss of interface contact between attached sheets and failure of the fastener system.

Resistance to fatigue failure is also affected by the small bearing area resulting from the clearance between the body of the nut and its hole. The small bearing area does not afford as much resistance to cyclic shear forces as does the larger area produced by an interference fit and therefore creates an aggravated cold working condition. Moreover, the clearance allows the nut to be displaced from its normal, unstressed axis with cyclic shear loading creating a materials working condition which may lead to fatigue failure of the sheets or the nut body.

Perhaps the biggest shortcoming with this type of fastener in resisting fatigue is the fact that the clearance normally provided makes it impossible to preload the walls of the hole in tensile hoop stress. A preloaded condition prevents at least some of the cold working which would otherwise be experienced because the hole material must experience a load in excess of its preload hoop stress before the body of the nut and its surrounding sheets experience the type of condition which might lead to fatigue failure.

SUMMARY OF THE INVENTION

The invention provides a three-piece blind fastener and fastener system constructed to provide an interference fit between the fastener's nut and a hole in the sheets in which the fastener is installed.

In one form, the fastener includes a nut having a conical nose at one end, a head at the other end, an intermediate portion between the two ends and an internally threaded axial bore. The intermediate portion of the nut is longitudinally tapered from the head to the conical nose with the taper converging towards the conical nose. The nut is adapted for insertion in a hole in a pair of sheets. The hole and the tapered intermediate portion of the nut cooperate to provide an interference fit between the nut and the hole at least at the faying surfaces of the sheets and preferably throughout the length of the intermediate portion. The sheets have a driving and a blind side. The conical nose of the nut extends beyond the blind side in the mounted condition while the head is on the driving side. The fastener also includes a core bolt which has a head, a threaded shank portion and a breakoff portion. The threaded breakoff portion is separated from the shank portion by a breakneck groove which fails upon the application of a predetermined torsional stress to the core bolt. The bolt is threaded in the axial bore of the nut with the breakoff portion extending outwardly and away from the driving side of the sheets and the bolt head extending outwardly from the conical nose. A sleeve is provided between the bolt head and the nose. The sleeve is capable of expansion over the nose to bear against the blind side of the sheets. This expansion occurs upon rotation of the core bolt to draw the bolt head towards the blind side of the sheets which allows the core bolt head to engage the sleeve and force it over the nose. During the setting operation, the nut is rotationally and axially constrained.

The blind fastener system of the present invention includes at least two sheets in overlapping relationship with one another. The sheets have a driving side, a blind side and a tapered hole extending at least from the driving side to the faying surfaces of the two sheets. The taper of the hole converges towards the blind side. A nut is inserted in the hole of the two sheets. The nut has a conical nose at one end and a head at its other end with an intermediate portion between the two ends. The intermediate portion is longitudinally tapered from the head to the conical nose for interference cooperation with the hole in the two sheets at least at their faying surfaces. The nut has an internally threaded, axial bore for receiving a core bolt. The core bolt has a head on the blind side of the sheets and a threaded shank portion. The threaded shank portion is in threaded engagement with the threads in the axial bore of the nut. An expanded sleeve between the core bolthead and the blind side of the sheets is provided. The sleeve has a first and a second end and an internal bore. The first end of the sleeve is in compressive engagement with the blind side of the sheets while the second end is in compressive engagement with the head of the core bolt. The internal bore of the sleeve receives the conical nose with the sleeve exerting a compressive force on the nose. The fastener exerts a clamp-up force on the sheets which is manifested by a compressive force exerted by the head of the nut on the driving side of the sheets and a compressive force exerted by the sleeve on the blind side of the sheets.

The fastener is set in the sheets in the following manner. The nut with its tapered intermediate portion is inserted in a hole in the sheets. The core bolt and sleeve are inserted with the nut, with the sleeve between the conical nose of the nut and the core bolt's head. The breakoff portion of the core bolt extends outwardly of the driving side of the sheets. A driving tool engages the breakoff portion and axially and rotationally constrains the nut. The driving tool rotates the breakoff portion to draw the core bolt head towards the blind side of the sheets. While the head is being drawn, the sleeve expands over the nose of the nut and eventually engages the blind side of the sheets. When a predetermined torsional stress is reached in the breakneck groove of the core bolt, the breakoff portion will separate from the shank of the core bolt and the fastener is set.

The fastener and fastener system of the present invention provide enhanced bearing and fatigue resistance over their prior art counterparts. The tapered intermediate portion of the nut makes it possible for the nut to be in interference engagement with substantially the entire wall area of the nut's mating hole. The increased bearing resistance provided by this increase in bearing area increases the fastener system's bearing strength because it reduces the likelihood of plastic deformation. The interference between the nut's intermediate portion and the hole in which it is inserted at least at the faying surfaces of the sheets joined by the fastener increases fatigue resistance. Fatigue failure inevitably appears as cracks which emanate from the walls of the holes in the sheets' faying surfaces and eventually extend through the sheets and across to their edges. Interference engagement at the source of these cracks establishes a preloaded condition which resists this type of failure. In addition, the interference engagement prevents cold working of the component parts of the fastener system and therefore enhances the system's fatigue life.

These and other features, aspects and advantages of the present invention will become more apparent from the following description, appended claims and drawings.

BRIEF DESCRIPTION OF THE FIGURES

FIG. 1 is an expanded view of the improved fastener of the present invention, partly in half section;

FIG. 2 is an end view of the fastener illustrated in FIG. 1 taken along line 2–2; and FIG. 3 is a view, partly in half section, of the fastener illustrated in FIGS. 1 and 2 set in a pair of sheets.

DESCRIPTION OF THE PREFERRED EMBODIMENTS

The fastener illustrated in the Figures comprises, in general, a nut 10 and expansible sleeve 12 and a core bolt 14.

Nut 10 includes a conical head 15 which adapts the nut for flush mounting in a sheet. A plurality of wrenching recesses 16 are disposed in the nut's head to prevent the nut from rotating while the fastener is being set. These recesses are best illustrated in FIG. 2. A tapered intermediate portion 18 and a conical nose portion 20 form the balance of the structural portions of nut 10. Intermediate portion 18 has a longitudinal taper converging towards conical nose 20 from head 15. This longitudinal taper adapts the nut for interference engagement in a hole in a pair of sheets. The nut has an axially threaded bore 22 extending throughout its entire length.

Sleeve 12 is in the form of a cylinder having an interior bore 24 and a pair of internally chamfered ends 26 and 28. The chamfers are provided to facilitate the setting of the sleeve.

Core bolt 14 includes a head 30, a threaded shank portion 32, a breakneck groove 34 and a breakoff portion 36. The threads in both shank portion 32 and breakoff portion 36 are adapted for engagement in the threads of axial bore 22 of nut 10. Head 30 has an interior, annular shoulder 38 for engaging one end of sleeve 12 to expand it over conical nose 20 of nut 10. Breakoff portion 36 includes a pair of complementary wrenching flats for a driving tool. One of these wrenching flats is shown by reference numeral 40 while the other wrenching flat is disposed on the opposite side of core bolt 14 and is not shown. Breakneck groove 34 is provided in order that breakoff portion 36 may be separated from the remainder of core bolt 14 upon the application of a predetermined torsional stress.

FIG. 3 illustrates the fastener of FIGS. 1 and 2 in its set condition. The fastener is set by threading core bolt 14 in the threads of bore 22 of nut 10 with sleeve 12 interposed between nose 20 and head 30. The assembled fastener is then inserted through a tapered hole 50 in a pair of overlapping sheets 52 and 54. The hole illustrated is tapered its entire length. When the sheet thickness is sufficient to admit to a tapered hole, interference engagement over a large area is possible. However, when the sheets are thin or when the stress conditions to be encountered are likely to lead to fatigue problems, it is necessary to have interference engagement of the nut with the sheets at the latters' faying surfaces.

A driving tool (not shown) engages the threads of breakoff portion 36 and wrenching recesses 16 of nut 10. Nut 10 is constrained by the driving tool against axial displacement outwardly of sheet 52 and against rotation. Continued rotation of core bolt 14 will draw the bolt inwardly towards the blind side of sheet 54 to engage expansible sleeve 12 and drive it over nose 20 of nut 10. Sleeve 12 will be driven over nose 20 until it engages the blind side of sheet 54 with a relatively high compressive force. The compressive force is provided, as is the driving force, by core bolt head 30 through the core bolt from the driving tool. Sleeve 12 will exert a considerable clamping force on the smooth portion of shank 32 as well as the conical surface of nose 20. When a predetermined torsional stress is reached in the core bolt, breakoff portion 36 will separate from the remainder of the core bolt by failure of the bolt at breakneck groove 34. After separation, the set fastener looks as it does in FIG. 3.

The set fastener exhibits considerable bearing and fatigue resistance by virtue of the interference engagement of intermediate portion 18 with tapered hole 50 in sheets 52 and 54. The interference engagement insures a continuous area of contact between the fastener and the sheets in which it is mounted which is not available as a practical matter if intermediate portion 18 were made cylindrical. The result is that there is more area available in the sheets and the fastener body to resist bearing forces and avoid permanent deformation of the sheets. As was previously pointed out, the interference engagement between the nut at the sheets in which it is installed, at least at the faying surfaces of the sheets, increases fatigue life.

The present invention has been described with reference to a certain preferred embodiment. The spirit and scope of the appended claims should not, however, necessarily be limited to the foregoing description.

I claim:

1. A blind fastener system comprising:

a. at least two sheets in overlapping, abutting and compressive relationship with each other at their faying surfaces, the sheets having a driving side, a blind side and a hole extending through the sheets, the hole having a taper extending from the driving side to at least the abutting faying surfaces of the sheets, the taper of the hole converging towards the blind side, the sheets being substantially completely planar at least at the tapered hole;

b. a nut having a conical nose at one end, a head at the other end, an intermediate portion between the two ends and an internally threaded axial bore, the intermediate portion being longitudinally tapered throughout its length with the taper converging towards the conical nose, the nut being within the hole in the sheets with the nose extending beyond the blind side, the head on the driving side and the intermediate portion in interference engagement with the wall of the tapered hole at least at the area thereof at the abutting faying surfaces of the sheets, the head and the tapered intermediate portion exerting an axial compressive force on the sheets on the driving side and on the wall of the tapered hole, respectively;

c. a core bolt having a head and a threaded shank portion, the head extending outwardly from the conical nose and the threaded shank portion being threaded in the axial bore of the nut;

d. a sleeve having a first end, a second end and an internal bore, the first end being in compressive engagement only with the blind side of the sheets, the second end being in compressive engagement with the head of the core bolt and the internal bore receiving the conical nose with the sleeve exerting a direct compressive force on the conical nose only exteriorally of said sheet; and e. the compressive relationship of the sheets being defined by the compressive force of the head and the tapered intermediate portion on the sheets acting towards the blind side, and the compressive engagement of the first end of the sleeve on the blind side acting towards the driving side;

f. said parts of said system when in set position not being cold worked, due to the interference engagement being within the elastic limits of said parts, said sheets having no permanent deformation.

2. The blind fastener system claimed in claim 1 wherein:

a. the driving side sheet has a conical recess for the head of the nut, the conical recess being coaxial with the tapered hole and having a considerably greater taper than the tapered hole;

b. the head of the nut is conical, the conical surface of the nut being in mating, compressive relationship with the surface of the conical recess; and c. at least one wrenching recess is provided in the head of the nut, the wrenching recess extending radially from the axial bore for receiving a wrenching tool to thereby define a relatively think wall between the base of the recess and the conical surface of the head of the nut.

3. The blind fastener system claimed in claim 2 wherein four of the wrenching recesses are provided, the wrenching recesses being orthogonally disposed with respect to each other and having a greater radial dimension than the largest radial dimension of the intermediate portion.

PO-1050
(5/69)

UNITED STATES PATENT OFFICE
CERTIFICATE OF CORRECTION

Patent No. 3,596,948     Dated   August 3, 1971

Inventor(s)    Thomas F. Spoehr

It is certified that error appears in the above-identified patent and that said Letters Patent are hereby corrected as shown below:

In the claims: Claim 2, column 6, line 10, "think" should be --thin--.

Signed and sealed this 5th day of September 1972.

(SEAL)
Attest:

EDWARD M. FLETCHER, JR.          ROBERT GOTTSCHALK
Attesting Officer                Commissioner of Patents